Patented Sept. 29, 1953

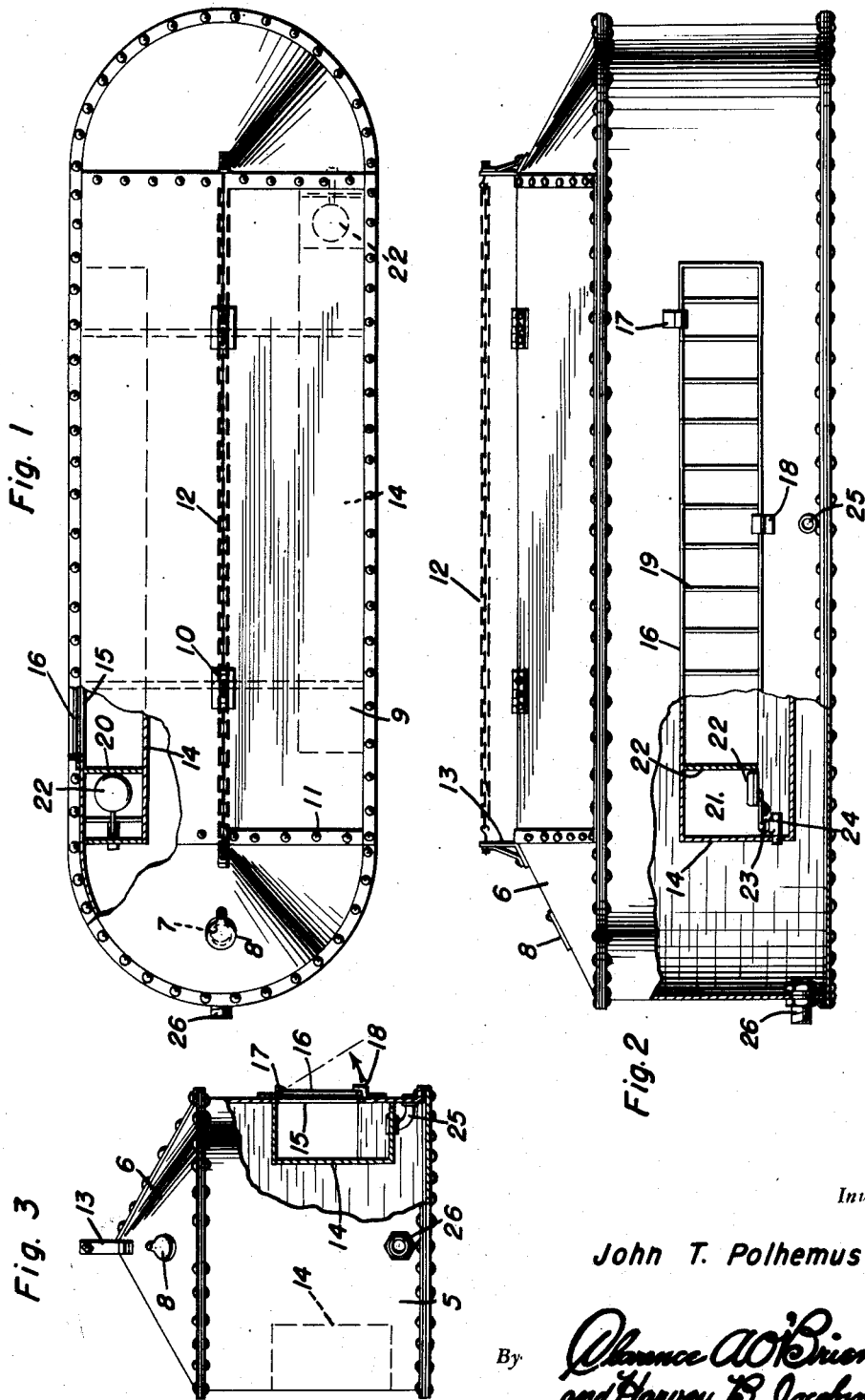

2,653,572

UNITED STATES PATENT OFFICE 2,653,572

AUTOMATIC POULTRY WATERER

John T. Polhemus, Peoria, Ill.

Application September 20, 1950, Serial No. 185,866

3 Claims. (Cl. 119—79)

The present invention relates to new and useful improvements in poultry drinking fountains and more particularly to a portable fountain for turkeys.

An important object of the invention is to provide a reservoir in a water tank for supplying water to a pair of drinking troughs at opposite sides of the tank with a float controlled valve for each trough to regulate the level of water in the trough and arranged whereby the water in the reservoir serves to keep the water in the troughs cool.

Another object is to provide a novel grill in the front of each drinking trough to prevent the poultry from splashing water in the trough.

A further object is to provide a device of this character of simple and practical construction, which is efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout, and in which:

Figure 1 is a top plan view with parts shown in section;

Figure 2 is a side elevational view with parts shown in section and;

Figure 3 is an end elevational view with parts shown in section.

Referring now to the drawing in detail, wherein for the purpose of illustration I have disclosed a preferred embodiment of my invention, the numeral 5 designates a substantially oval shaped water tank preferably constructed in sheet metal and having a gable type roof or top 6.

One end of top 6 is provided with a filling opening 7 with a pivoted cover 8 and at one side of the top 6 is an inspection door 9 provided with hinges 10 at the ridge of the top. The door 9 may be held closed by screws 11.

An anti-roosting chain 12 is supported longitudinally above top 6 by brackets 13.

A pair of drinking troughs 14 are welded or otherwise suitable secured at the interior of the tank at the opposite sides thereof and above the bottom of the tank and an elongated opening 15 is formed in the side of the tank at the upper portion of each trough and at a height suitable for poultry to drink from the troughs. The tank forms a reservoir for supplying water to the troughs.

A grill 16 is supported in front of opening 15 by hanger brackets 17 for the upper edge of the grill and upstanding lug brackets 18 behind which the lower edge of the grill is engaged to hold the grill in position. The grill includes vertical spaced apart bars 19 to admit the heads of the poultry for drinking from the trough and which prevent the poultry from splashing the water while drinking. The grill may be lifted from the brackets 17 and 18 for cleaning the trough.

Each trough 14 is provided with a vertical baffle 20 at one end to form a float chamber 21 in which a float 22 for a valve 23 is placed, the valve controlling flow of water through a pipe 24 in one end of the trough leading from the water reservoir of the tank to regulate the level of water supplied to the trough.

The bottom of each trough 14 is provided with a drain pipe 25 and tank 5 is also provided with a drain pipe 26, both of which may be capped or plugged when desired.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by spirit of the invention as herein described and the scope of the appended claims.

Having described the invention, what is claimed as new is:

1. A poultry drinking fountain comprising a tank having elongated side walls and a bottom wall, one of said side walls having an opening intermediate its upper and lower edges, said opening extending substantially throughout the extent of said one side wall, a box-like trough member of substantially rectangular cross section having a top, bottom, two ends and having one side open interiorly of said tank, and having its top, bottom and ends sealingly engaging the inside of said side wall around said opening and said side wall being spaced therebelow to form a trough, a grill secured to said tank in covering relation to said opening and including a plurality of spaced apart bars sub-dividing said trough into a series of poultry drinking stations, a conduit interconnecting said tank and said trough, and a float valve in said trough operatively associated with said conduit for maintaining a predetermined level of water in the trough.

2. The combination of claim 1 wherein a drain conduit is provided in said tank, said drain conduit having one end opening into said trough through the bottom thereof, the other end of said drain conduit opening outside said tank through said one side wall below the bottom of said trough.

3. The combination of claim 1 wherein hangers are provided adjacent the edges of said opening, said grill being removably supported by said hangers.

JOHN T. POLHEMUS.

References Cited in the file of this patent

UNITED STATES PATENTS

| Number | Name | Date |
|---|---|---|
| 682,627 | Mack | Sept. 17, 1901 |
| 1,208,947 | Ginther | Dec. 19, 1918 |
| 1,329,516 | Evison | Feb. 3, 1920 |
| 1,346,307 | Eaton | July 13, 1920 |